US008555296B2

(12) United States Patent
Zakonov (10) Patent No.: US 8,555,296 B2
(45) Date of Patent: *Oct. 8, 2013

(54) SOFTWARE APPLICATION ACTION MONITORING

(75) Inventor: Alex Zakonov, Manchester, CT (US)

(73) Assignee: Microsoft Corporation, Redmond, WA (US)

( * ) Notice: Subject to any disclaimer, the term of this patent is extended or adjusted under 35 U.S.C. 154(b) by 1017 days.

This patent is subject to a terminal disclaimer.

(21) Appl. No.: 12/589,575

(22) Filed: Oct. 26, 2009

(65) Prior Publication Data

US 2010/0131962 A1    May 27, 2010

Related U.S. Application Data

(63) Continuation of application No. 11/070,933, filed on Mar. 2, 2005, now Pat. No. 7,707,588.

(60) Provisional application No. 60/549,441, filed on Mar. 2, 2004.

(51) Int. Cl.
G06F 3/00    (2006.01)

(52) U.S. Cl.
USPC .......................................... 719/328; 719/330

(58) Field of Classification Search
USPC .......................................... 719/318, 328, 330
See application file for complete search history.

(56) References Cited

U.S. PATENT DOCUMENTS

| 5,687,182 | A | 11/1997 | Shikakura | |
|---|---|---|---|---|
| 6,467,052 | B1 | 10/2002 | Kaler et al. | |
| 6,537,228 | B1 * | 3/2003 | Lambert | 600/506 |
| 6,714,976 | B1 * | 3/2004 | Wilson et al. | 709/224 |
| 7,224,686 | B1 | 5/2007 | Doskow et al. | |
| 2003/0195997 | A1 * | 10/2003 | Ibert et al. | 709/318 |
| 2003/0229693 | A1 * | 12/2003 | Mahlik et al. | 709/224 |
| 2004/0250261 | A1 * | 12/2004 | Huibregtse | 719/318 |

OTHER PUBLICATIONS

Browne, A Portable Programmin interface for Performane Evaluation on Modern Processors, Aug. 1, 2000.*

* cited by examiner

Primary Examiner — Lechi Truong
(74) Attorney, Agent, or Firm — Workman Nydegger (57) ABSTRACT

A system and method for collecting runtime resource information generated by an active software application is provided and includes identifying an occurrence of a function event generated for a software application operating on a predetermined platform, determining a duration of a monitored function called in response to the function event, comparing the duration with a threshold to determine if the duration exceeds the threshold, wherein if the duration is greater than or equal to the threshold then collecting runtime resource information responsive to the monitored function and processing the runtime resource information responsive to the monitored function.

20 Claims, 7 Drawing Sheets

SOFTWARE APPLICATION ACTION MONITORING

RELATED APPLICATIONS

This Application is a continuation of U.S. patent application Ser. No. 11/070,933 filed Mar. 2, 2005 now U.S. Pat. No. 7,707,588 and claims priority of U.S. Provisional Patent Application No. 60/549,441 filed Mar. 2, 2004, the contents of which are hereby incorporated by reference herein.

FIELD OF THE INVENTION

This invention relates generally to software performance and more particularly to the collection and monitoring of information related to resource level actions.

BACKGROUND OF THE INVENTION

Application performance is one of the components that contribute to overall software quality. As such, different types of diagnostic tools have been developed to help diagnose, analyze and improve application performance. Most of these tools collect extensive information about the application performance for pre-production usage in development, test, or staging environments and include application code profilers, stress load simulators, database profilers and others. Unfortunately, however while pre-production performance analysis is crucial, it typically does not address all performance related issues. For example, consider the situation of a typical modern application that consists of multiple application components interacting with each other. Two factors that may contribute to the performance of each application component include the execution time of the application component code itself and the time spent on resource requests for external application components and systems, such as relational databases, LDAP resources, web services and others.

The execution time of the component code typically has a predictable dependency on the execution environment and the application state and as such, typically may be optimized in the development and/or the test environment. On the other hand, the resource request execution time varies greatly depending upon the resource state and the application environment. In fact, in many cases it is very hard or nearly impossible to emulate a real production state on a test platform or a staging platform. One example of such a situation involves a database driven system with a high volume of data that is too large and/or expensive to replicate on a test platform. Other examples involve software applications that rely on external Web services, wherein the external Web services are not controlled by the development team and as a result, cannot be properly stress tested.

For these types of situations, it is desirable to monitor and collect information relating to the performance of the application in the production environment. The production environment puts specific requirements on monitoring tools. One of these requirements involves a proper balance between the performance information collected and the overhead introduced by a monitoring tool. For this reason, a monitoring tool should be able collect enough information to facilitate discovery of a performance problem's root cause while introducing a minimal amount of disturbance to the production system. Another requirement involves the ability to detect application performance problems at the application action level and the ability to correlate the application performance with heavy resource requests to provide the root cause for application performance degradation.

SUMMARY OF THE INVENTION

A method for collecting runtime resource information generated by an active software application is provided and includes identifying an occurrence of a function event generated for a software application operating on a predetermined platform, determining a duration of a monitored function called in response to the function event, comparing the duration with a threshold to determine if the duration exceeds the threshold, wherein if the duration is greater than or equal to the threshold then collecting runtime resource information responsive to the monitored function and processing the runtime resource information responsive to the monitored function.

Furthermore, a method for collecting runtime resource information generated by a software application operating on a computer platform is provided and includes identifying an occurrence of a function event generated for the software application and determining a duration of a monitored function called in response to the function event. The method further includes comparing the duration with a threshold to determine if the duration exceeds the threshold, wherein if the duration is greater than or equal to the threshold, then the method also includes collecting runtime resource information responsive to the monitored function, identifying the type of the monitored function and processing the runtime resource information responsive to the function type, wherein if the function type is a Resource Interface Call function, then processing includes at least one of, maintaining a current resource call sensitivity threshold, and resetting a resource call sensitivity threshold, and if the function type is an Application Level Action function, then processing includes at least one of discarding the runtime resource information, and generating an alert including function type information.

A system for operating a software application on a computer platform is provided, wherein the system includes machine-readable computer program code including instructions for causing a controller to implement a method for collecting runtime resource information generated by a software application. The system further includes a means for implementing a method including, identifying an occurrence of a function event generated for a software application operating on a predetermined platform, determining a duration of a monitored function called in response to the function event, comparing the duration with a threshold to determine if the duration exceeds the threshold, wherein if the duration is greater than or equal to the threshold then, collecting runtime resource information responsive to the monitored function and processing the runtime resource information responsive to the monitored function.

A computer readable storage medium including computer-executable instructions for causing a controller to implement a method for collecting runtime resource information generated by a software application. The method includes identifying an occurrence of a function event generated for a software application operating on a predetermined platform and determining a duration of a monitored function called in response to the function event. The method also includes comparing the duration with a threshold to determine if the duration exceeds the threshold, wherein if the duration is greater than or equal to the threshold then the method also includes collecting runtime resource information responsive to the monitored function and processing the runtime resource information responsive to the monitored function.

BRIEF DESCRIPTION OF DRAWINGS

The foregoing and other features and advantages of the present invention will be more fully understood from the following detailed description of illustrative embodiments, taken in conjunction with the accompanying drawings in which like elements are numbered alike in the several Figures.

DETAILED DESCRIPTION OF THE INVENTION

It should be appreciated that the embodiment(s) described hereinbelow define at least one type of function for monitoring, wherein the monitored function may include application level actions. Application level actions typically correspond to actions produced by an application consumer, such as a user or other system(s) that may use services provided by the application. Typical examples of application level actions are web page requests, web service calls and handler events for a user interface control. Another type of monitored function may include resource interface calls. Resource interface calls are functions that provide a synchronous interface for an external resource, such as a relational or object database, file system, LDAP resource, web service, or any other type of data provider.

It should be further appreciated that the embodiment(s) described hereinabove may define a set of thresholds that control runtime data collection from the monitored functions. These thresholds may include alerting threshold(s) and sensitivity threshold(s), wherein the alerting threshold typically applies to application level actions and may define when an alert containing information about an action may need to be generated. Alerting thresholds may be set for all actions in an application, for a type of action, or for a specific action. Examples of setting the threshold for action types may include settings thresholds for web page calls, web service calls and for UI control event handlers. Examples of setting the threshold for a specific action may include setting thresholds for a specific web page or specific web method. Sensitivity thresholds typically apply to resource interface calls and may define when runtime information about a call needs to be collected and included into an application level action alert. These thresholds may be used for providing minimum overhead to a monitored application and may be defined for all resource interface calls in an application and for a specific resource interface call(s).

Figure 1A:
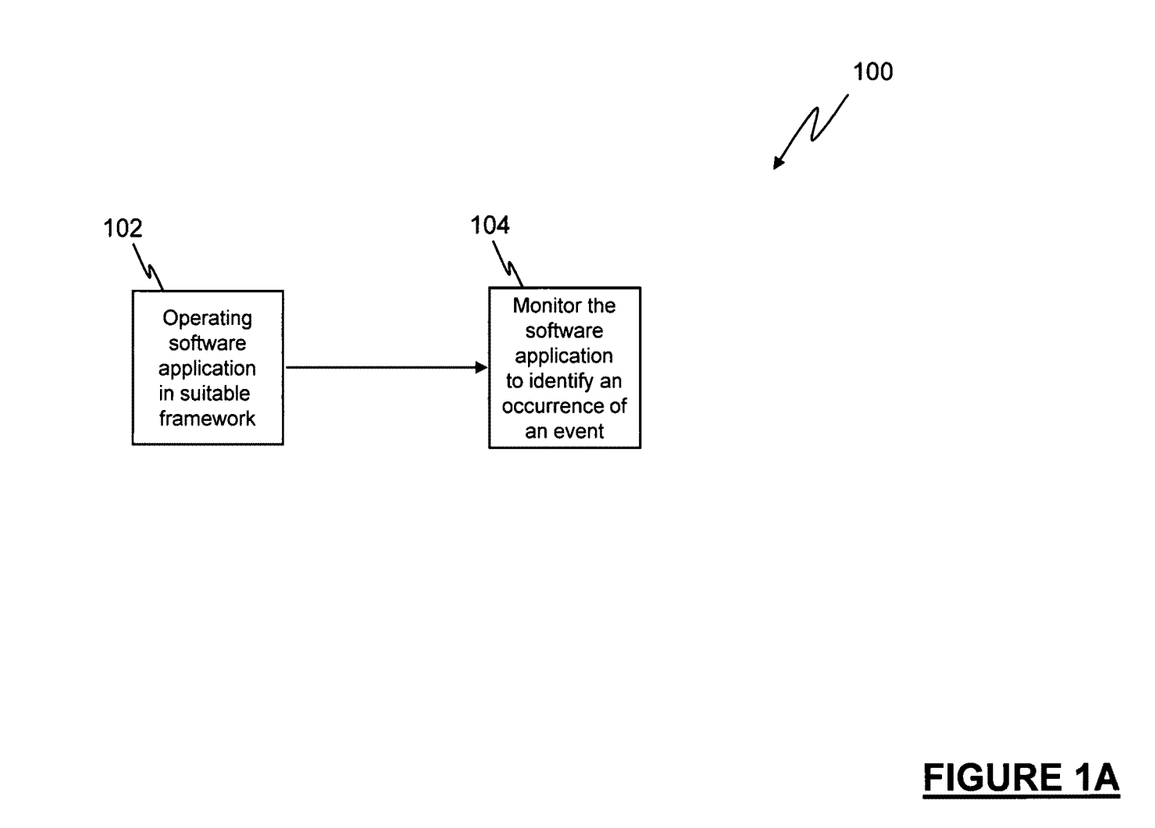
FIG. 1A is a block diagram illustrating one embodiment of an overall method for monitoring and collecting runtime resource information generated by an active software application, in accordance with an exemplary embodiment.
Figure 1B:
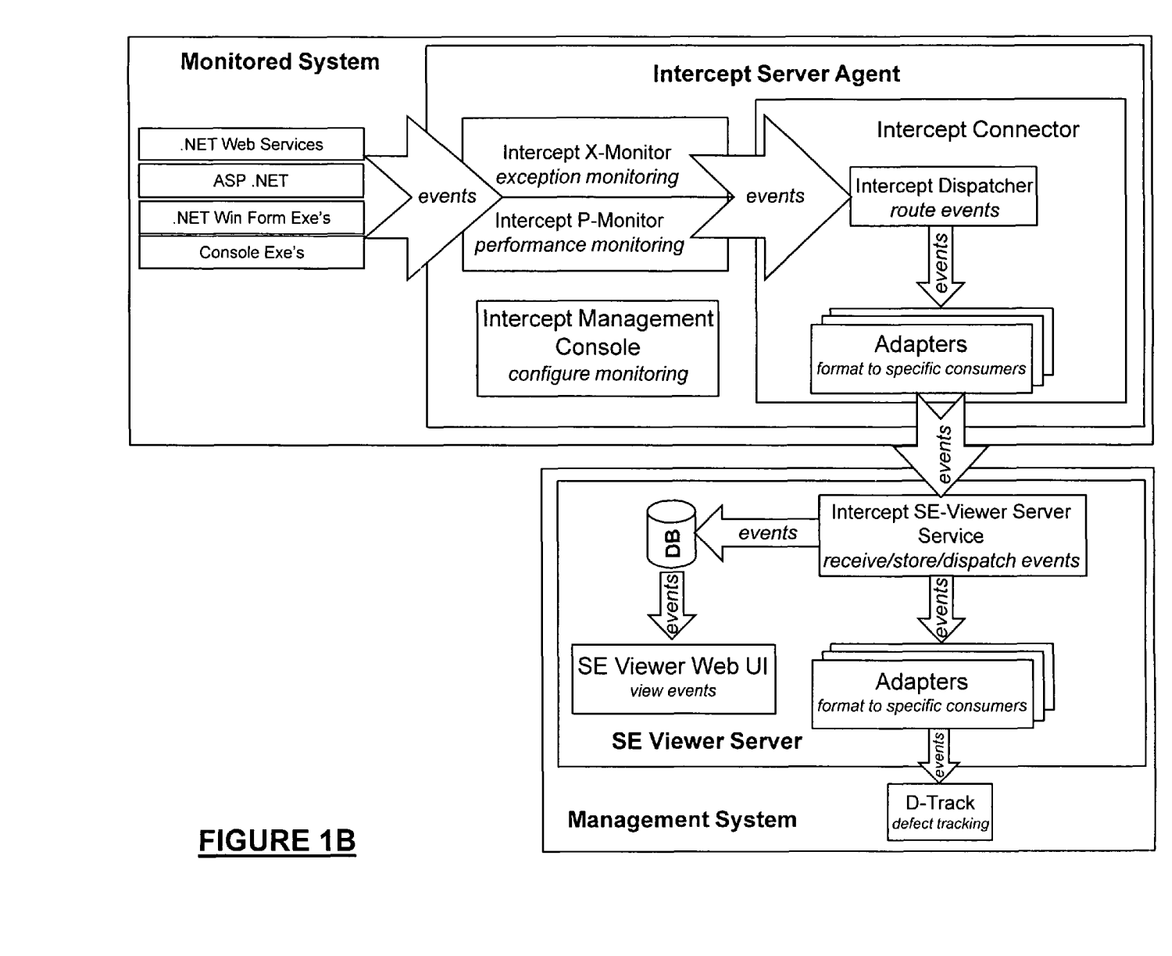
FIG. 1B is a block diagram illustrating one embodiment of an architecture for implementing the method for monitoring and collecting runtime resource information generated by an active software application illustrated in FIG. 1A.

Referring to FIG. 1A and FIG. 1B, a block diagram illustrating a method 100 for monitoring and collecting runtime resource information generated by an active software application is shown and includes operating a software application in a suitable framework, as shown in operational block 102. The function of the software application is monitored to identify the occurrence of an event generated by an active software application, as shown in operational block 104. It should be appreciated that runtime information may be collected and an analysis of the threshold(s) may be performed via an Enter Event (EE) and a Leave Events (LE) for the monitored functions, wherein the leave events may include normal completion of a function and/or a termination of a function due to an exception event. It should also be appreciated that attachment to those events may be implemented using instrumentation or monitoring APIs of the application runtime environment.

Figure 2:
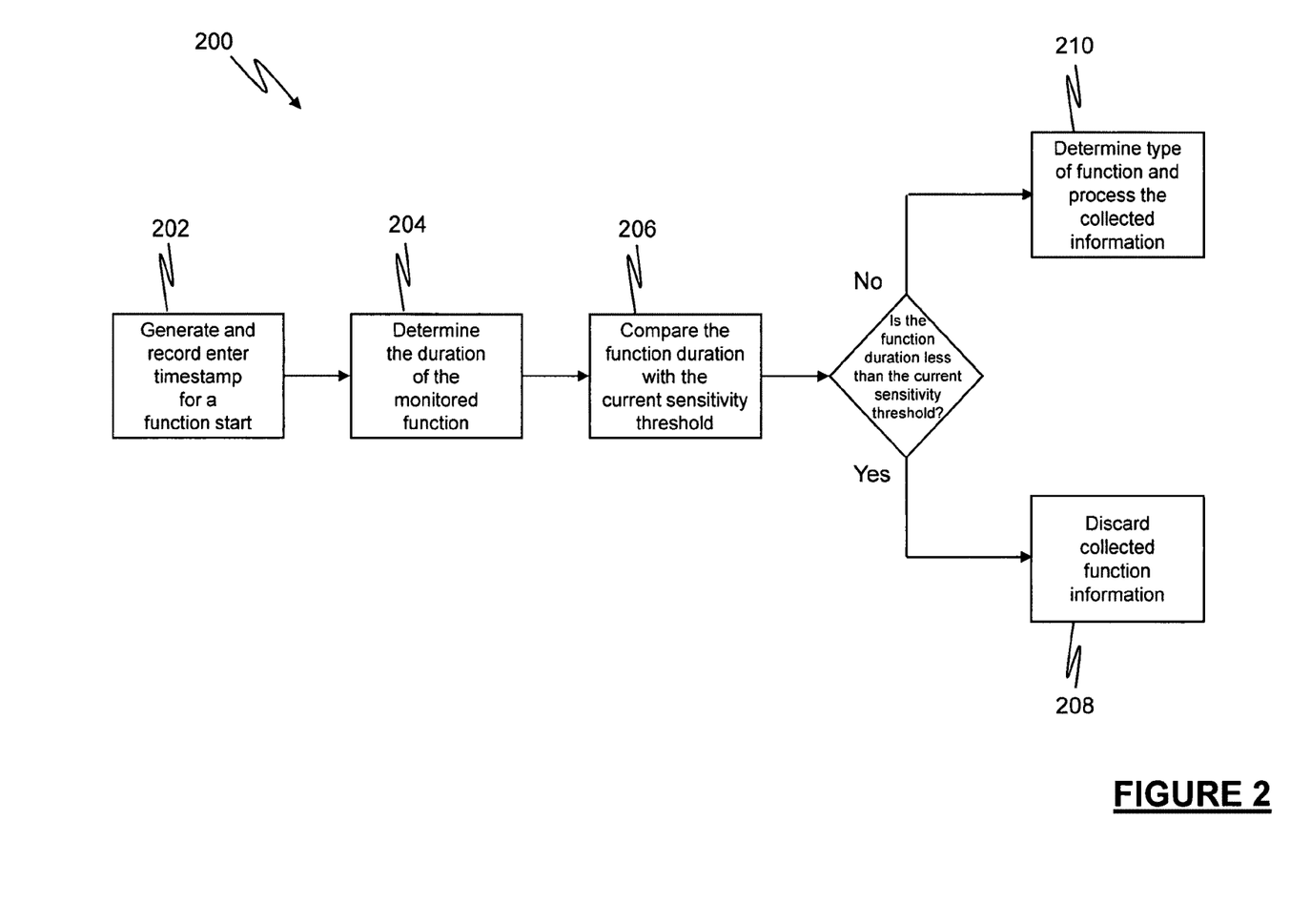
FIG. 2 is a block diagram illustrating one embodiment of the method of FIG. 1A.

Referring to FIG. 2, a block diagram 200 illustrating one embodiment for collecting information is shown and discussed. During an EE for a monitored function, an enter timestamp for the function start is generated and recorded, as shown in operational block 202. In a similar fashion, during an LE, the duration of the function is determined, as shown in operational block 204. This may be accomplished by generating a leave timestamp for the termination of the function and calculating the duration using the enter timestamp and/or the leave timestamp. Once the duration of the function has been determined, the duration may then be compared against the current sensitivity threshold, as shown in operational block 206. If the function duration is less than the sensitivity threshold, then the collected function information may be discarded, operational block 208. Otherwise, if the function duration is equal to or greater than the sensitivity threshold, then the type of function is determined, as shown in operational block 210, and the collected information is processed responsive, at least in part, to the function type.

Figure 3:
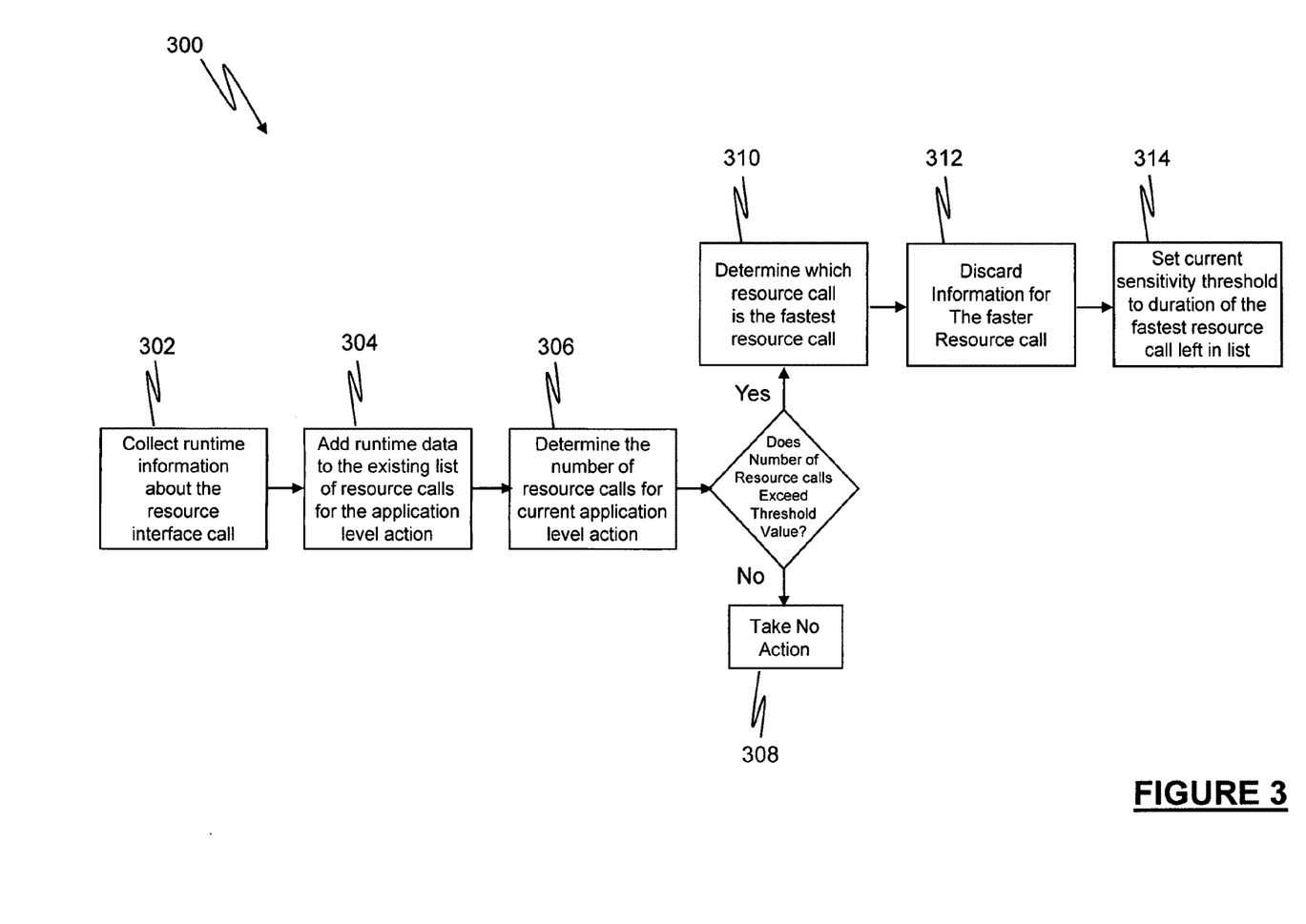
FIG. 3 is a block diagram illustrating one embodiment of the method of FIG. 1A.

Referring to FIG. 3, a block diagram 300 illustrating one embodiment for processing collected information responsive to a Resource Interface Call function type, as shown in operational block 210, is shown and discussed. If the function type is a resource interface call then the runtime information about the resource interface call is collected from the function parameters and member variables, as shown in operational block 302. The runtime data is added to an existing list of resource calls for the current application level action on the current thread, as shown in operational block 304, and the number of resource calls for the current application level action is determined, as shown in operational block 306. If the number of resource calls do not exceed a predetermined "threshold" value, then no action is taken, as shown in operational block 308. However, if the number of resource calls do exceed the predetermined "threshold" value, then the set of resource calls is examined to determine which resource call is the fastest resource call, i.e. which resource call has the shortest duration time, as shown in operational block 310. The information about the fastest resource call is discarded, as shown in operational block 312, and the current sensitivity threshold may be set to the duration of the fastest resource call left in the list of resource calls, as shown in operational block 314.

Figure 4:
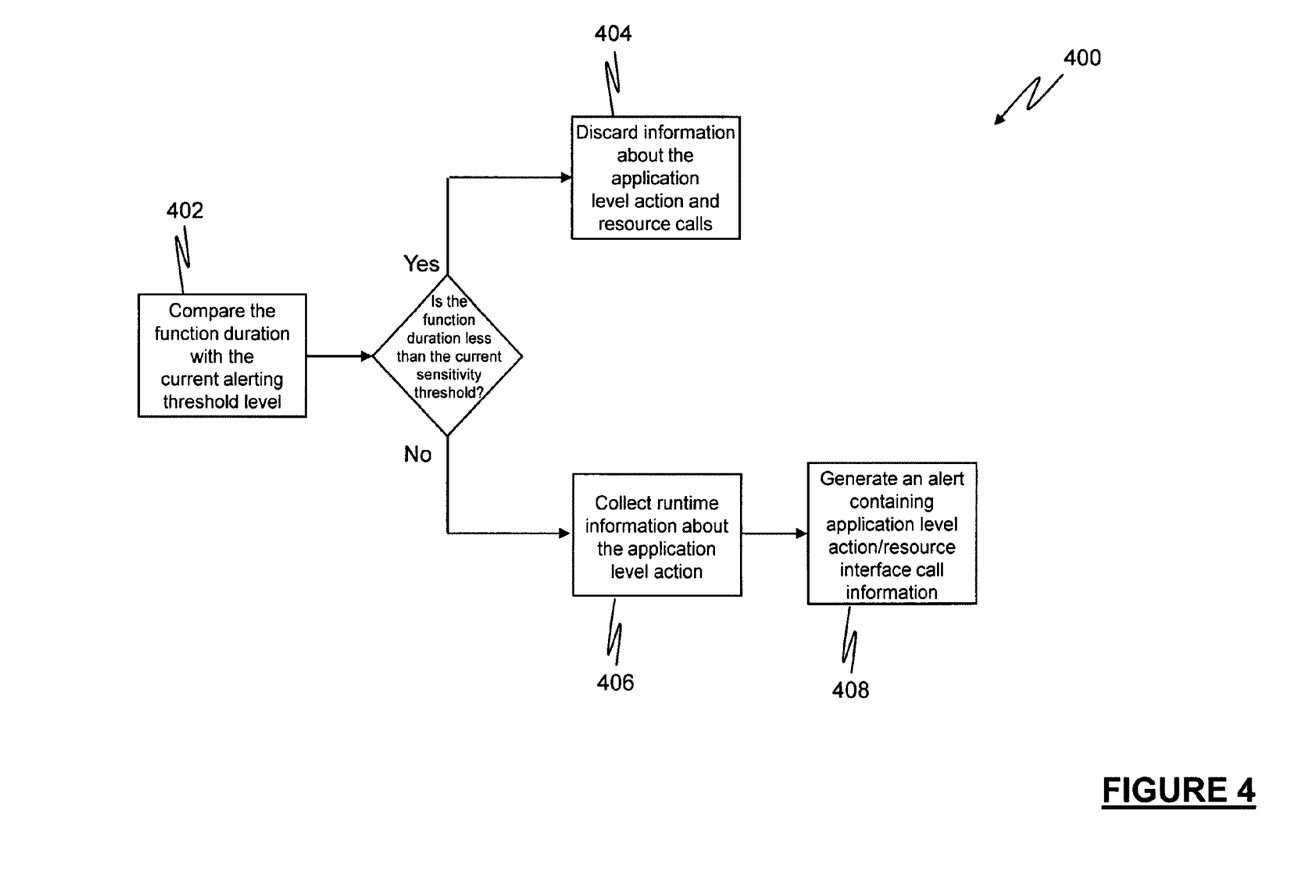
FIG. 4 is a block diagram illustrating one embodiment of the method of FIG. 1A.

Referring to FIG. 4, a block diagram 400 illustrating one embodiment for processing collected information responsive to an Application Level Action function type, as shown in operational block 210. If the function type is an application level action function type then the duration of the function is compared with the current alerting threshold level, as shown in operational block 402. If the duration of the function is less than the alerting threshold level, then information about the application level action and the resource calls for this function is discarded, as shown in operational block 404. However, if the duration of the function is equal to or greater than the alerting threshold level, runtime information about the application level action is collected, as shown in operational block 406, and an alert containing the application level action information and resource interface call information may be generated, as shown in operational block 408. It should be appreciated that although runtime information about the application level action is collected from the parameters and member variables, any method for collecting and/or generating runtime information about the application level action suitable to the desired end purpose may be used.

It should be appreciated that method 100 discussed herein allows for the monitoring and collection of root cause information of application level hot-spots in an application operating in a production environment with a minimal impact on application performance. It should also be appreciated that although method 100 is discussed herein in the context of a software application which seamlessly integrates into the .NET framework to provide a rich Application Programming Interface (API) for customization purposes and that is compatible with Windows Management Instrumentation (WMI), method 100 may be used in any context and/or platform suitable to the desired end purpose. Furthermore, it should be appreciated that method 100 may be integrated with third party operation management and issue tracking systems, such as Microsoft Operating Manager (MOM), Tivoli, BMC and HP Open View, by either direct integration or by using intermediary integration techniques.

Figure 5:
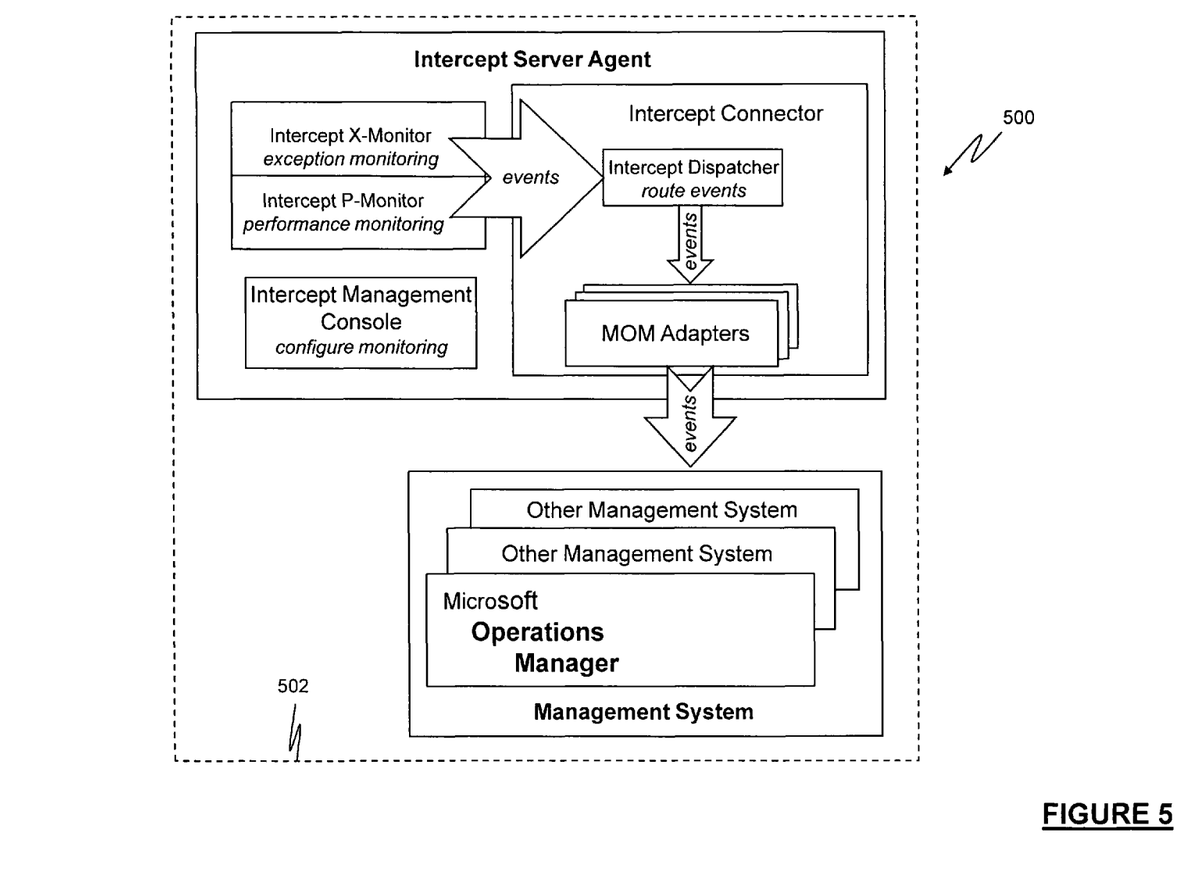
FIG. 5 is a block diagram illustrating a direct integration approach for implementing the method of FIG. 1A.

Referring to FIG. 5, a block diagram 500 illustrating a direct integration approach 502 is shown wherein the method 100 assumes that a third party management system takes full responsibility for exception events, including event delivery, event storage, event consolidation, event visualization and event interpretation. Moreover, the method 100 relies on a software intercept connector which includes an event dispatcher and multiple connector adapters. When it is determined that an exception event has occurred, the intercept monitor software application reports the event to an event dispatcher. The event dispatcher routes the event to the appropriate consumer's event class and event source, wherein connector adapters may be responsible for communications between the event dispatcher and the event consumers. As such, the connector adapters may remove the dependency between the event dispatcher and the event consumers to allow multiple event consumers to be supported. The connector adapters may include, but are not limited to, SE-Viewer adapter, WMI adapter and Windows event log adapter. It should be appreciated that the WMI adapter may also enable communication with any WMI compatible operations management system.

Figure 6:
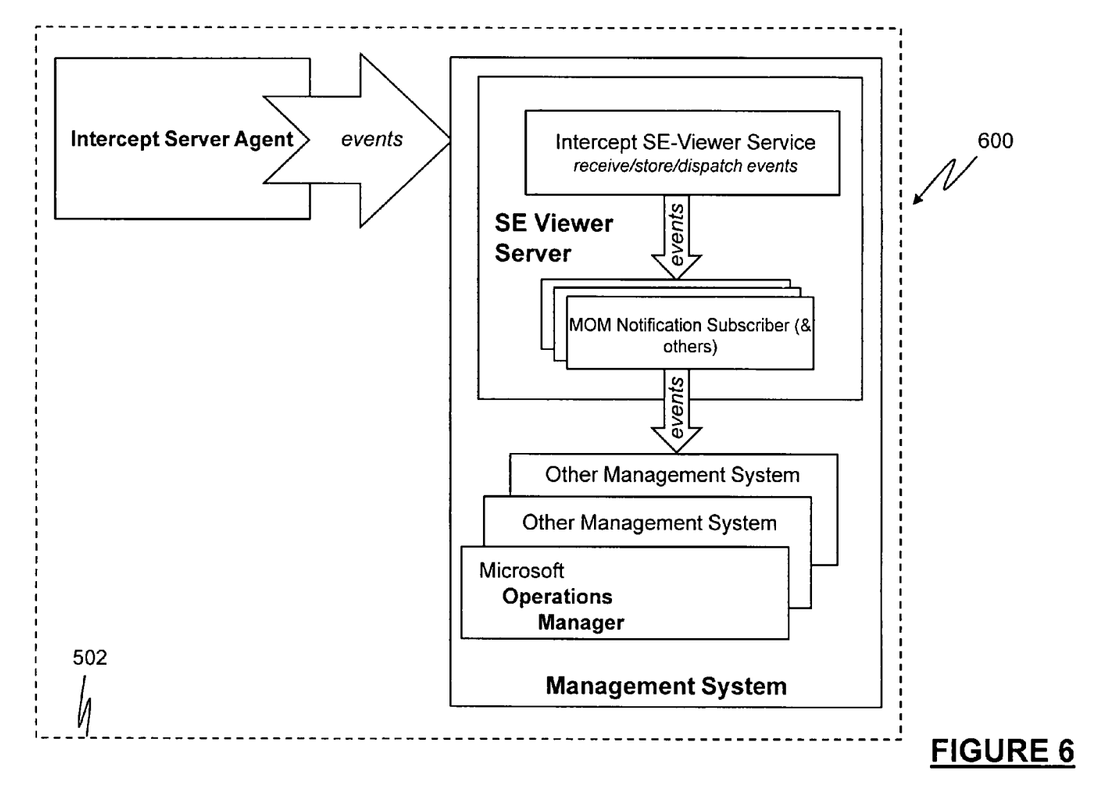
FIG. 6 is a block diagram illustrating an indirect integration approach for implementing the method of FIG. 1A using an SE-Viewer as an intermediary.

Referring to FIG. 6, a block diagram 600 illustrating an indirect integration approach 602 is shown, wherein the integration approach is using an SE-Viewer intermediary between the method 100 and a third party management system. In this approach, the requirements for a third party event management system may be simpler than in the direct approach 502 since the intermediary performs tasks such as event delivery, event storage, event visualization and event interpretation. It should be appreciated that the third party management system may be responsible for managing links to the events. It should also be appreciated that the SE-Viewer integration relies on an event notification mechanism, which may, or may not be, provided by the SE-Viewer server. When the SE-Viewer server receives an exception event, a notification is sent to SE-Viewer subscribers, wherein the SE-Viewer provides a standard API for developing notification subscribers. The current list of subscribers may include Windows Event Log notification, WMI notification and e-mail notification. The Windows Event Log and WMI notifications may be, or may not be, intended for integration with a third party network operation management system(s). In this case, the SE-Viewer server may be responsible for the initial event delivery, event storage and event visualization. Additionally, the third party operation management system may hold a link to the event stored in the SE-Viewer server.

It should be appreciated that the method 100 of FIG. 1 may collect additional information including the call stack, function parameters, local variables and object variables. Additionally, users may easily adjust the level of detail to limit the alerts to specific transactions, locations and/or groups.

As described above, the method 100 of FIG. 1, in whole or in part, may be embodied in the form of computer program code containing instructions wherein, when the computer program code is loaded into and executed by a computer, the computer becomes an apparatus for practicing the invention. As such, the method 100 of FIG. 1, in whole or in part, may be embodied in the form of computer-implemented processes and apparatuses for practicing those processes. The method 100 of FIG. 1, in whole or in part, may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Existing systems having reprogrammable storage (e.g., flash memory) may be updated to implement the invention. The method 100 of FIG. 1 may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments may configure the microprocessor to create specific logic circuits.

It should be appreciated that method 100 described hereinabove may be implemented with any platform suitable to the desired end purpose, such as a .NET, a J2EE, a J2SE and/or a J2ME platform. Moreover, it should be appreciated that method 100 described hereinabove allows for the collection of resource specific runtime information about performance hot spots in the context of application level actions with minimal impact on application performance. The information may be collected by monitoring application runtime environment such as Microsoft CLR, Java virtual machine, or any other application execution environment. This monitoring may be achieved using monitoring APIs, which may or may not be, provided by the runtime environment or automatic code instrumentations. Additionally, code instrumentation may be performed at runtime or at compile time.

While the invention has been described with reference to an exemplary embodiment, it should be understood by those skilled in the art that various changes may be made and equivalents may be substituted for elements thereof without departing from the scope of the invention. In addition, many modifications may be made to adapt a particular situation or material to the teachings of the invention without departing from the scope thereof Therefore, it is intended that the invention not be limited to the particular embodiment disclosed as the best mode contemplated for carrying out this invention, but that the invention will include all embodiments falling within the scope of the appended claims. Moreover, unless specifically stated any use of the terms first, second, etc. do not denote any order or importance, but rather the terms first, second, etc. are used to distinguish one element from another.

What is claimed is:

1. A method for collecting runtime resource information generated by an active software application, the method comprising:
    identifying an occurrence of a function event generated for a software application operating on a predetermined platform;
    determining a duration of a monitored function called in response to said function event;
    comparing said duration with a threshold to determine if said duration exceeds said threshold, wherein if said duration is greater than or equal to said threshold then,
    collecting runtime resource information responsive to said monitored function; and
    processing the runtime resource information responsive to said monitored function,
    wherein if said monitored function is a Resource Interface Call function, then processing includes:
        collecting said runtime resource information from function parameters and member variables responsive to said Resource Interface Call function;
        adding said runtime resource information to an existing list of resource calls for said function event; and
        determining a quantity of resource calls for said Resource Interface Call function; and
        if said quantity of resource calls exceeds a resource call threshold, then said quantity of resource calls is examined to identify a first fastest resource call and a second fastest resource call, wherein information responsive to said first fastest resource call is discarded and said resource call sensitivity threshold is set to the duration of said second fastest resource call.

2. The method of claim 1, wherein when said monitored function comprises an Applicant Level Action then said processing further includes comparing said duration with an alerting threshold level, wherein
    if said duration is less than said alerting threshold level, then information responsive to said Application Level Action function is discarded, and
    if said duration is greater than or equal to said alerting threshold level, then said runtime resource information responsive to said Application Level Action function is collected and an alert containing said runtime resource information responsive to said Application Level Action function is generated.

3. The method of claim 2, wherein said runtime resource information responsive to said Application Level Action function includes resource call interface information.

4. The method of claim 1, wherein said active software application is configured to operate on at least one computer platform, said at least one computer platform including at least one of a .NET framework platform, a J2EE platform, a J2SE platform and a J2ME platform.

5. The method of claim 1, wherein said monitoring includes monitoring said software application to detect said function event occurrence.

6. The method of claim 1, wherein said duration is determined by,
    generating an event start timestamp responsive to the start of said event,
    generating an event end timestamp responsive to the end of said event, and
    determining a time difference between said event start timestamp and said event end timestamp.

7. The method of claim 1, wherein said Application Level Action function include at least one of a Web page request, a web service call, a handler event for a user interface control or an application function.

8. The method of claim 7, wherein said runtime resource information includes at least one of a value of a function parameter and a value of an object member variable.

9. A method for collecting runtime resource information generated by a software application operating on a computer platform, the method comprising:
    identifying an occurrence of a function event generated for the software application;
    determining a duration of a monitored function called in response to said function event;
    comparing said duration with a threshold to determine if said duration exceeds said threshold, wherein if said duration is greater than or equal to said event duration threshold, then
    collecting runtime resource information responsive to said monitored function;
    identifying function type of said monitored function; and
    processing the runtime resource information responsive to said monitored function,
    wherein if the monitored function is a Resource Interface Call then said processing includes:
        collecting said runtime resource information from function parameters and member variables responsive to said Resource Interface Call function;
        adding said runtime resource information to an existing list of resource calls for said function event; and
        determining a quantity of resource calls for said Resource Interface Call function; and
        if said quantity of resource calls exceeds a resource call threshold, then said quantity of resource calls is examined to identify a first fastest resource call and a second fastest resource call, wherein information responsive to said first fastest resource call is discarded and said resource call sensitivity threshold is set to the duration of said second fastest resource call; and
    wherein if the monitored function is an Application Level Action function then said processing includes:
        comparing said duration with an alerting threshold level, wherein
            if said duration is less than said alerting threshold level, then information responsive to said Application Level Action function is discarded, and
            if said duration is greater than or equal to said alerting threshold level, then said runtime resource information responsive to said Application Level Action function is collected and an alert containing said runtime resource information responsive to said Application Level Action function is generated.

10. The method of claim 9, wherein said computer platform includes at least one of a .NET framework platform, a J2EE platform, a J2SE platform and a J2ME platform.

11. The method of claim 9, wherein said identifying an occurrence includes monitoring said software application to detect said function event occurrence.

12. The method of claim 9, wherein said duration is determined by,
  generating an event start timestamp responsive to the start of said event,
  generating an event end timestamp responsive to the end of said event, and
  determining a time difference between said event start timestamp and said event end timestamp.

13. The method of claim 9, wherein said runtime resource information responsive to said Application Level Action function includes at least one of resource call interface information, a value of a function parameter and a value of an object member variable.

14. The method of claim 9, wherein said Application Level Action function include at least one of a Web page request, a web service call, a handler event for a user interface control or an application function.

15. One or more hardware storage device having stored computer-executable instructions which, when executed by at least one computer processor, implement a method for collecting runtime resource information generated by a software application operating on a computer platform, the method comprising:
  identifying an occurrence of a function event generated for the software application;
  determining a duration of a monitored function called in response to said function event;
  comparing said duration with a threshold to determine if said duration exceeds said threshold, wherein if said duration is greater than or equal to said event duration threshold, then
    collecting runtime resource information responsive to said monitored function;
    identifying function type of said monitored function; and
  processing the runtime resource information responsive to said monitored function,
  wherein if the monitored function is a Resource Interface Call then said processing includes:
    collecting said runtime resource information from function parameters and member variables responsive to said Resource Interface Call function;
    adding said runtime resource information to an existing list of resource calls for said function event; and
    determining a quantity of resource calls for said Resource Interface Call function; and
    if said quantity of resource calls exceeds a resource call threshold, then said quantity of resource calls is examined to identify a first fastest resource call and a second fastest resource call, wherein information responsive to said first fastest resource call is discarded and said resource call sensitivity threshold is set to the duration of said second fastest resource call; and
  wherein if the monitored function is an Application Level Action function then said processing includes:
    comparing said duration with an alerting threshold level, wherein
      if said duration is less than said alerting threshold level, then information responsive to said Application Level Action function is discarded, and
      if said duration is greater than or equal to said alerting threshold level, then said runtime resource information responsive to said Application Level Action function is collected and an alert containing said runtime resource information responsive to said Application Level Action function is generated.

16. The one or more storage device as recited in claim 15, wherein the one or more storage device comprises one or more computers.

17. One or more hardware storage device having stored computer-executable instructions which, when executed by at least one processor, implement a method for collecting runtime resource information generated by a software application operating on a computer platform, the method comprising:
  method for collecting runtime resource information generated by an active software application, the method comprising:
  identifying an occurrence of a function event generated for a software application operating on a predetermined platform;
  determining a duration of a monitored function called in response to said function event;
  comparing said duration with a threshold to determine if said duration exceeds said threshold, wherein if said duration is greater than or equal to said threshold then,
  collecting runtime resource information responsive to said monitored function; and
  processing the runtime resource information responsive to said monitored function,
  wherein if said monitored function is a Resource Interface Call function, then processing includes:
    collecting said runtime resource information from function parameters and member variables responsive to said Resource Interface Call function;
    adding said runtime resource information to an existing list of resource calls for said function event; and
    determining a quantity of resource calls for said Resource Interface Call function; and
    if said quantity of resource calls exceeds a resource call threshold, then said quantity of resource calls is examined to identify a first fastest resource call and a second fastest resource call, wherein information responsive to said first fastest resource call is discarded and said resource call sensitivity threshold is set to the duration of said second fastest resource call.

18. The one or more storage device as recited in claim 17, wherein the one or more storage device comprises one or more computers.

19. One or more hardware storage device having stored computer-executable instructions which, when executed by at least one processor, implement a method for collecting runtime resource information generated by a software application operating on a computer platform, the method comprising:
  method for collecting runtime resource information generated by an active software application, the method comprising:
  identifying an occurrence of a function event generated for a software application operating on a predetermined platform;
  determining a duration of a monitored function called in response to said function event;
  comparing said duration with a first threshold to determine if said duration exceeds said first threshold, wherein if said duration is greater than or equal to said first threshold then,
  collecting runtime resource information responsive to said monitored function; and processing the runtime resource information responsive to said monitored function, wherein when said monitored function comprises an Application Level Action function, said processing further includes, comparing said duration with an alerting threshold level, and wherein:

if said duration is greater than or equal to the first the first threshold but less than said alerting threshold level then information responsive to said Application Level Action function is discarded, and if said duration is greater than or equal to the first threshold and greater than or equal to said alerting threshold level, then said runtime resource information responsive to said Application Level Action function is collected and an alert containing said runtime resource information responsive to said Application Level Action function is generated.

20. The one or more storage device as recited in claim 19, wherein the one or more storage device comprises one or more computers.

* * * * *